US012094479B2

(12) United States Patent
Fischer et al.

(10) Patent No.: US 12,094,479 B2
(45) Date of Patent: *Sep. 17, 2024

(54) AUDIO DECODER, APPARATUS FOR GENERATING ENCODED AUDIO OUTPUT DATA AND METHODS PERMITTING INITIALIZING A DECODER

(71) Applicant: Fraunhofer-Gesellschaft zur Foerderung der angewandten Forschung e.V., Munich (DE)

(72) Inventors: Daniel Fischer, Fuerth (DE); Bernd Czelhan, Happurg (DE); Max Neuendorf, Nuremberg (DE); Nikolaus Rettelbach, Nuremberg (DE); Ingo Hofmann, Nuremberg (DE); Harald Fuchs, Roettenbach (DE); Stefan Doehla, Erlangen (DE); Nikolaus Faerber, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,818

(22) Filed: Mar. 1, 2024

(65) Prior Publication Data

US 2024/0212697 A1 Jun. 27, 2024

Related U.S. Application Data

(63) Continuation of application No. 18/307,584, filed on Apr. 26, 2023, which is a continuation of application (Continued)

(30) Foreign Application Priority Data

Oct. 18, 2013 (EP) .................................... 13189328

(51) Int. Cl.

*G10L 19/16* (2013.01)
*G10L 19/22* (2013.01)
*G10L 19/24* (2013.01)

(52) U.S. Cl.

CPC ............ *G10L 19/167* (2013.01); *G10L 19/22* (2013.01); *G10L 19/24* (2013.01)

(58) Field of Classification Search

CPC ........ G10L 19/167; G10L 19/22; G10L 19/24
See application file for complete search history.

(56) References Cited

U.S. PATENT DOCUMENTS

| | | | |
|---|---|---|---|
| 6,735,567 | B2 | 5/2004 | Gao et al. |
| 6,871,106 | B1 | 3/2005 | Ishikawa et al. |

(Continued)

FOREIGN PATENT DOCUMENTS

| | | | |
|---|---|---|---|
| CN | 1240978 | A | 1/2000 |
| CN | 1444351 | A | 9/2003 |

(Continued)

OTHER PUBLICATIONS

"Guidelines for Implementation: DASH-AVC/264 Interoperability Points", http://dashif.org/w/2013/08/DASH-AVC-264-v2.00-hd-mca.pdf, DASH Industry Forum, version 2.0, Aug. 15, 2013, 47 pages.

(Continued)

*Primary Examiner* — Samuel G Neway
(74) *Attorney, Agent, or Firm* — PERKINS COIE LLP; Michael A. Glenn

(57) ABSTRACT

An audio decoder decodes a bit stream of encoded audio data, which bit stream represents a sequence of audio sample values and includes a plurality of frames, wherein each frame includes associated encoded audio sample values. The audio decoder includes a determiner configured to determine whether a frame of the encoded audio data is a special frame including encoded audio sample values associated with the (Continued)

special frame and additional information, wherein the additional information include encoded audio sample values of a number of frames preceding the special frame, wherein the encoded audio sample values of the preceding frames are encoded using the same codec configuration as the special frame, wherein the number of preceding frames is sufficient to initialize the decoder to be in a position to decode the audio sample values associated with the special frame if the special frame is the first frame upon start-up of the decoder.

11 Claims, 8 Drawing Sheets

Related U.S. Application Data

No. 17/655,990, filed on Mar. 22, 2022, now Pat. No. 11,670,314, which is a continuation of application No. 16/840,825, filed on Apr. 6, 2020, now Pat. No. 11,423,919, which is a continuation of application No. 16/256,243, filed on Jan. 24, 2019, now Pat. No. 10,614,824, which is a continuation of application No. 15/916,592, filed on Mar. 9, 2018, now Pat. No. 10,229,694, which is a continuation of application No. 15/131,646, filed on Apr. 18, 2016, now Pat. No. 9,928,845, which is a continuation of application No. PCT/EP2014/072063, filed on Oct. 14, 2014.

(56) References Cited

U.S. PATENT DOCUMENTS

| | | | | |
|---|---|---|---|---|
| 9,928,845 | B2 * | 3/2018 | Fischer | G10L 19/24 |
| 10,229,694 | B2 * | 3/2019 | Fischer | G10L 19/167 |
| 10,614,824 | B2 * | 4/2020 | Fischer | G10L 19/167 |
| 11,423,919 | B2 * | 8/2022 | Fischer | G10L 19/167 |
| 11,670,314 | B2 * | 6/2023 | Fischer | G10L 19/22 704/500 |
| 2003/0002609 | A1 * | 1/2003 | Faller | H04J 3/1688 375/372 |
| 2003/0174728 | A1 | 9/2003 | Kamiya et al. | |
| 2005/0075869 | A1 * | 4/2005 | Gersho | G10L 19/173 704/223 |
| 2005/0261900 | A1 | 11/2005 | Ojala et al. | |
| 2007/0206690 | A1 | 9/2007 | Sperschneider et al. | |
| 2007/0223660 | A1 * | 9/2007 | Dei | G10L 19/24 704/E19.044 |
| 2007/0282600 | A1 | 12/2007 | Ojanpera | |
| 2011/0080940 | A1 | 4/2011 | Bocharov et al. | |
| 2011/0106546 | A1 | 5/2011 | Fejzo | |
| 2011/0158326 | A1 * | 6/2011 | Kordon | G11B 20/10527 375/E7.027 |
| 2011/0173010 | A1 * | 7/2011 | Lecomte | G10L 19/20 704/500 |
| 2011/0218799 | A1 | 9/2011 | Mittal et al. | |
| 2013/0064283 | A1 * | 3/2013 | Sun | H04N 21/23439 375/E7.026 |
| 2014/0109153 | A1 * | 4/2014 | Venkatraman | H04N 21/43632 725/62 |
| 2016/0232910 | A1 * | 8/2016 | Fischer | G10L 19/22 |
| 2018/0197556 | A1 * | 7/2018 | Fischer | G10L 19/167 |
| 2019/0156844 | A1 * | 5/2019 | Fischer | G10L 19/24 |
| 2020/0234726 | A1 * | 7/2020 | Fischer | G10L 19/24 |
| 2022/0215850 | A1 * | 7/2022 | Fischer | G10L 19/22 |
| 2023/0335146 | A1 * | 10/2023 | Fischer | G10L 19/167 |

FOREIGN PATENT DOCUMENTS

| | | | |
|---|---|---|---|
| CN | 102577272 | A | 7/2012 |
| EP | 1396843 | A1 | 3/2004 |
| EP | 2259254 | A2 | 12/2010 |
| EP | 2581902 | A1 | 4/2013 |
| JP | 2007538283 | A | 12/2007 |
| JP | 2011523090 | A | 8/2011 |
| KR | 1020110055545 | A | 5/2011 |
| KR | 1020120128136 | A | 11/2012 |
| RU | 2355046 | C2 | 5/2009 |
| RU | 2387022 | C2 | 4/2010 |
| RU | 2408089 | C9 | 4/2011 |
| WO | 2010003563 | A1 | 1/2010 |
| WO | 2010005224 | | 1/2010 |
| WO | 2010005224 | A2 | 1/2010 |
| WO | 2010036061 | A2 | 4/2010 |

OTHER PUBLICATIONS

ISO/IEC 23003-3 , "Information Technology—MPEG audio technologies—Part 3: Unified Speech and Audio Coding", International Standard, ISO/IEC FDIS 23003-3, Nov. 23, 2011, 286 pp.

ISO/IEC DTR , "Information technology—Coding of audio-visual objects—Part 24: Audio and Systems Interaction", ISO/IEC DTR 14496-24, [SC29/WG 11 N 8837],, Feb. 27, 2007, 16 pages.

Valin, Jm , et al., "Defintion of the Opus Audio Codec", IETF, pp. 1-326.

* cited by examiner

| Syntax | No. of bits | Mnemonic |
|---|---|---|
| AudioPreRoll() | | |
| { | | |
|     **configLen** = escapedValue(4,4,8); | 4..16 | |
|     Config() | 8*configLen | |
|     **numPreRollFrames** = escapedValue(2,4,0); | 2..6 | |
|     for (frameIdx=0; frameIdx < numPreRollFrames; ++frameIdx ) { | | |
|         **auLen** | 32 | uimsbf |
|         AccessUnit() | 8*auLen | |
|     } | | |
| } | | |

FIG 10

AUDIO DECODER, APPARATUS FOR GENERATING ENCODED AUDIO OUTPUT DATA AND METHODS PERMITTING INITIALIZING A DECODER

CROSS-REFERENCE TO RELATED APPLICATIONS

This application is a continuation of copending U.S. patent application Ser. No. 18/307,584, filed Apr. 26, 2023, which in turn is a continuation of U.S. patent application Ser. No. 17/655,990, filed Mar. 232, 2022, which is a continuation of U.S. patent application Ser. No. 16/840,825, filed Apr. 6, 2020, which is a continuation of U.S. patent application Ser. No. 16/256,243, filed Jan. 24, 2019, which is a continuation of U.S. patent application Ser. No. 15/916,592, filed Mar. 9, 2018, which is a continuation of U.S. patent application Ser. No. 15/131,646, filed Apr. 18, 2016, which in turn is a continuation of International Application No. PCT/EP2014/072063, filed Oct. 14, 2014, which is incorporated herein by reference in its entirety, and additionally claims priority from European Application No. 13189328.1, Oct. 18, 2013, which is incorporated herein by reference in its entirety.

TECHNICAL FIELD

The present invention is related to audio encoding/decoding and in particular to an approach of encoding and decoding data, which permits initializing a decoder such as it may be useful when switching between different codec configurations.

BACKGROUND OF THE INVENTION

Embodiments of the invention may be applied to scenarios, in which properties of transmission channels may vary widely depending on access technology, such as DSL, WiFi, 3G, LTE and the like. Mobile phone reception may fade indoors or in rural areas. The quality of wireless internet connections strongly depends on the distance to the base station and access technology, leading to fluctuations of the bitrate. The available bitrate per user may also change with the number of clients connected to one base station.

SUMMARY

According to an embodiment, an audio decoder for decoding a bit stream of encoded audio data, wherein the bit stream of encoded audio data represents a sequence of audio sample values and has a plurality of frames, wherein each frame includes associated encoded audio sample values, may have: a determiner configured to determine whether a frame of the bit stream of encoded audio data is a special frame having encoded audio sample values associated with the current frame and additional information, wherein the additional information have encoded audio sample values of a number of frames preceding the special frame, wherein the encoded audio sample values of the preceding frames are encoded using the same codec configuration as the current frame, wherein the number of preceding frames is sufficient to initialize the decoder to be in a position to decode the audio sample values associated with the current frame if the special frame is the first frame upon start-up of the decoder; and an initializer configured to initialize the decoder if the determiner determines that the frame is a special frame, wherein initializing the decoder has decoding the encoded audio sample values included in the additional information before decoding the encoded audio sample values associated with the current frame, wherein the initializer is configured to switch the audio decoder from the first codec configuration to the different second codec configuration if the determiner determines that the frame is a special frame and if the audio sample values of the current frame have been encoded using the different second codec configuration, and wherein the audio decoder is configured to utilize bitrate adaption by switching between different encoded representations of the same audio content.

According to another embodiment, a method for decoding a bit stream of encoded audio data, wherein the bit stream of encoded audio data represents a sequence of audio sample values and has a plurality of frames, wherein each frame includes associated encoded audio sample values, may have the steps of: determining whether a frame of the bitstream of encoded audio data is a special frame having encoded audio sample values associated with a current frame and additional information, wherein the additional information have encoded audio sample values of a number of frames preceding the special frame, wherein the encoded audio sample values of the preceding frames are encoded using the same codec configuration as the special frame, wherein the number of preceding frames is sufficient to initialize a decoder to be in a position to decode the audio sample values associated with the current frame if the special frame is the first frame upon start-up of the decoder; and initializing the decoder if it is determined that the frame is a special frame, wherein the initializing has decoding the encoded audio sample values included in the additional information before decoding the encoded audio sample values associated with the current frame, switching the audio decoder from the first codec configuration to the different second codec configuration if it is determined that the frame is a special frame and if the audio sample values of the special frame have been encoded using the different second codec configuration, wherein the decoder is configured to utilize bitrate adaption by switching between different encoded representations of the same audio.

Another embodiment may have a non-transitory digital storage medium having a computer program stored thereon to perform a method for decoding a bit stream of encoded audio data, wherein the bit stream of encoded audio data represents a sequence of audio sample values and has a plurality of frames, wherein each frame includes associated encoded audio sample values, having the step of: determining whether a frame of the bitstream of encoded audio data is a special frame having encoded audio sample values associated with a current frame and additional information, wherein the additional information have encoded audio sample values of a number of frames preceding the special frame, wherein the encoded audio sample values of the preceding frames are encoded using the same codec configuration as the special frame, wherein the number of preceding frames is sufficient to initialize a decoder to be in a position to decode the audio sample values associated with the current frame if the special frame is the first frame upon start-up of the decoder; and initializing the decoder if it is determined that the frame is a special frame, wherein the initializing has decoding the encoded audio sample values included in the additional information before decoding the encoded audio sample values associated with the current frame, switching the audio decoder from the first codec configuration to the different second codec configuration if it is determined that the frame is a special frame and if the audio sample values of the special frame have been encoded using the different second codec configuration, wherein the decoder is configured to utilize bitrate adaption by switching between different encoded representations of the same audio, when said computer program is run by a computer or a processor.

Embodiments of the invention provide an audio decoder for decoding a bit stream of encoded audio data, wherein the bit stream of encoded audio data represents a sequence of audio sample values and comprises a plurality of frames, wherein each frame includes associated encoded audio sample values, the audio decoder comprising:

a determiner configured to determine whether a frame of the encoded audio data is a special frame comprising encoded audio sample values associated with the special frame and additional information, wherein the additional information comprise encoded audio sample values of a number of frames preceding the special frame, wherein the encoded audio sample values of the preceding frames are encoded using the same codec configuration as the special frame, wherein the number of preceding frames is sufficient to initialize the decoder to be in a position to decode the audio sample values associated with the special frame if the special frame is the first frame upon start-up of the decoder; and an initializer configured to initialize the decoder if the determiner determines that the frame is a special frame, wherein initializing the decoder comprises decoding the encoded audio sample values included in the additional information before decoding the encoded audio sample values associated with the special frame.

Embodiments of the invention provide an apparatus for generating a bit stream of encoded audio data representing a sequence of audio sample values of an audio signal, wherein the bit stream of encoded audio data comprise a plurality of frames, wherein each frame includes associated encoded audio sample values, wherein the apparatus comprises:

a special frame provider configured to provide at least one of the frames as a special frame, the special frame comprising encoded audio sample values associated with the special frame and additional information, wherein the additional information comprise encoded audio sample values of a number of frames preceding the special frame, wherein the encoded audio sample values of the preceding frames are encoded using the same codec configuration as the special frame, and wherein the number of preceding frames is sufficient to initialize a decoder to be in a position to decode the audio sample values associated with the special frame if the special frame is the first frame upon start-up of the decoder; and an output configured to output the bit stream of encoded audio data.

Embodiments of the invention provide a method for decoding a bit stream of encoded audio data, wherein the bit stream of encoded audio data represents a sequence of audio sample values and comprises a plurality of frames, wherein each frame includes associated encoded audio sample values, comprising:

determining whether a frame of the encoded audio data is a special frame comprising encoded audio sample values associated with the special frame and additional information, wherein the additional information comprise encoded audio sample values of a number of frames preceding the special frame, wherein the encoded audio sample values of the preceding frames are encoded using the same codec configuration as the special frame, wherein the number of preceding frames is sufficient to initialize a decoder to be in a position to decode the audio sample values associated with the special frame if the special frame is the first frame upon start-up of the decoder; and initializing the decoder if it is determined that the frame is a special frame, wherein the initializing comprises decoding the encoded audio sample values included in the additional information before decoding the encoded audio sample values associated with the special frame.

Embodiments of the invention provide a method for generating a bit stream of encoded audio data representing a sequence of audio sample values of an audio signal, wherein the bit stream of encoded audio data comprise a plurality of frames, wherein each frame includes associated encoded audio sample values, comprising:

providing at least one of the frames as a special frame, the special frame comprising encoded audio sample values associated with the special frame and additional information, wherein the additional information comprise encoded audio sample values of a number of frames preceding the special frame, wherein the encoded audio sample values of the preceding frames are encoded using the same codec configuration as the special frame, and wherein the number of preceding frames is sufficient to initialize a decoder to be in a position to decode the audio sample values associated with the special frame if the special frame is the first frame upon start-up of the decoder; and generating the bit stream by concatenating the special frame and the other frames of the plurality of frames.

Embodiments of the invention are based on the finding that immediate replay of a bit stream of encoded audio data representing a sequence of audio sample values of an audio signal and comprising a plurality of frames can be achieved if one of the frames is provided as a special frame including encoded audio sample values associated with preceding frames, which may be used for initiating a decoder to be in a position to decode the encoded audio sample values associated with the special frame. The number of frames that may be used for initiating the decoder accordingly depends on the codec configuration used and is known for the codec configurations. Embodiments of the invention are based on the finding that switching between different codec configurations can be achieved in a beneficial manner if such a special frame is arranged at a position where switching between the coding configurations shall take place. The special frame may not only include encoded audio sample values associated with the special frame, but further information that allows switching between codec configurations and immediate replay upon switching. In embodiments of the invention, the apparatus and method for generating encoded audio output data and the audio encoder are configured to prepare encoded audio data in such a manner that immediate reply upon switching between codec configurations can take place at the decoder side. In embodiments of the invention, such audio data generated and output at the encoder side are received as audio input data at the decoder side and permit immediate replay at the decoder side. In embodiments of the invention, immediate replay is permitted at decoder side upon switching between different codec configurations at the decoder side.

In embodiments of the invention, the initializer is configured to switch the audio decoder from a current codec configuration to a different codec configuration if the determiner determines that the frame is a special frame and if the audio sample values of the special frame have been encoded using the different codec configuration.

In embodiments of the invention, the decoder is configured to decode the special frame using the current codec configuration and to discard the additional information if the determiner determines that the frame is a special frame and if the audio sample values of the special frame have been encoded using the current coded configuration.

In embodiments of the invention, the additional information comprise information on the codec configuration used for encoding the audio sample values associated with the special frame, wherein the determiner is configured to determine whether the codec configuration of the additional information is different from the current codec configuration.

In embodiments of the invention, the audio decoder comprises a crossfader configured to perform crossfading between a plurality of output sample values obtained using the current codec configuration and a plurality of output sample values obtained by decoding the encoded audio sample values associated with the special frame. In embodiments of the invention, the crossfader is configured to perform crossfading of output sample values obtained by flushing the decoder in the current codec configuration and output sample values obtained by decoding the encoded audio sample values associated with the special frame.

In embodiments of the invention, an earliest frame of the number of frames comprised in the additional information is not time-differentially encoded or entropy encoded relative to any frame previous to the earliest frame and wherein the special frame is not time-differentially encoded or entropy encoded relative to any frame previous to the earliest frame of the number of frames preceding the special frame or relative to any frame previous to the special frame.

In embodiments of the invention, the special frame comprises the additional information as an extension payload and wherein the determiner is configured to evaluate the extension payload of the special frame. In embodiments of the invention, the additional information comprise information on the codec configuration used for encoding the audio sample values associated with the special frame.

In embodiments of the invention, the encoded audio data comprise a plurality of segments, wherein each segment is associated with one of a plurality of portions of the sequence of audio sample values and comprises a plurality of frames, wherein the special frame adder is configured to add a special frame at the beginning of each segment.

In embodiment of the invention, the encoded audio data comprise a plurality of segments, wherein each segment is associated with one of a plurality of portions of the sequence of audio sample values and comprises a plurality of the frames, wherein the apparatus for generating a bit stream of encoded audio data comprises a segment provider configured to provide segments associated with different portions of the sequence of audio sample values and encoded by different codec configurations, wherein the special frame provider is configured to provide a first frame of at least one of the segments as the special frame; and a generator configured to generate the audio output data by arranging the at least one of the segments following another one of the segments. In embodiments of the invention, the segment provider is configured select a codec configuration for each segment based on a control signal. In embodiments of the invention, the segment provider is configured to provide m encoded versions of the sequence of audio sample values, with $m \geq 2$, wherein the m encoded versions are encoded using different codec configurations, wherein each encoded version comprises a plurality of segments representing the plurality of portions of the sequence of audio sample values, wherein the special frame provider is configured to provide a special frame at the beginning of each of the segments.

In embodiments of the invention, the segment provider comprises a plurality of encoders, each configured to encode at least in part the audio signal according to one of the plurality of different codec configurations. In embodiments of the invention, the segment provider comprises a memory storing the m encoded versions of the sequence of audio sample values.

In embodiments of the invention, the additional information are in the form of an extension payload of the special frame.

In embodiments of the invention, the method of decoding comprises switching the audio decoder from a current codec configuration to a different codec configuration if it is determined that the frame is a special frame and if the audio sample values of the special frame have been encoded using the different codec configuration.

In embodiments of the invention, the bit stream of encoded audio data comprises a first number of frames encoded using a first codec configuration and a second number of frames following the first number of frames and encoded using a second codec configuration, wherein the first frame of the second number of frames is the special frame.

In embodiments of the invention, the additional information comprise information on the codec configuration used for encoding the audio sample values associated with the special frame, and the method comprises determining whether the codec configuration of the additional information is different from the current codec configuration using which encoded audio sample values of frames in the bit stream, which precede the special frame, are encoded.

In embodiments of the invention, the method of generating a bit stream of encoded audio data comprises providing segments associated with different portions of the sequence of audio sample values and encoded by different codec configurations, wherein a first frame of at least one of the segments is provided as the special frame.

Thus, in embodiments of the invention, crossfading is performed in order to permit seamless switching between different codec configurations. In embodiments of the invention, the additional information of the special frame comprise the pre-roll frames that may be used for initializing a decoder to be in a position to decode the special frame. In other words, in embodiments of the invention, the additional information comprise a copy of that frames of encoded audio sample values preceding the special frame and encoded using the same codec configuration as the encoded audio sample values represented by the special frame that may be used for initializing the decoder to be in position to decode the audio sample values associated with the special frame.

In embodiments of the invention, special frames are introduced into encoded audio data at regular temporal intervals, i.e. in a periodic manner. In embodiments of the invention, a first frame of each segment of encoded audio data is a special frame. In embodiments, the audio decoder is configured to decode the special frames and following frames using the codec configuration indicated in the special frame until a further special frame indicating a different codec configuration is encountered.

In embodiments of the invention, the decoder and the method for decoding are configured to perform a crossfade when switching from one codec configuration to another codec configuration, in order to permit seamless switching between multiple compressed audio representations.

In embodiments of the invention, the different codec configurations are different codec configurations according to the AAC (Advanced Audio Coding) standard, i.e. different codec configurations of the AAC family codecs. Embodiments of the invention may be directed to switching between codec configurations of the AAC family codecs and codec configurations of the AMR (Adaptive Multiple Rate) family codecs.

Thus, embodiments of the invention permit for immediate replay at decoder side and switching between different codec configurations so that the manner in which audio content is delivered may be adapted to the environmental conditions, such as a transmission channel with variable bitrate. Thus, embodiments of the invention permit for providing the consumer with the best possible audio quality for a given network condition.

BRIEF DESCRIPTION OF THE DRAWINGS

Embodiments of the present invention will be detailed subsequently referring to the appended drawings, in which:

FIG. 10 shows an exemplary syntax element providing additional information.

DETAILED DESCRIPTION OF THE INVENTION

Generally, embodiments of the invention aim at the delivery of audio content, possibly combined with video delivery, over a transmission-channel with variable bitrate. The goal may be to provide a consumer with the best possible audio quality for a given network condition. Embodiments of the invention focus on the implementation of AAC family codecs into an adaptive streaming environment.

In embodiments of the invention, as used herein, audio sample values which are not encoded represent time domain audio sample values such as PCM (pulse code modulated) samples. In embodiments of the invention, the term encoded audio sample value refers to frequency domain sample values obtained after encoding the time domain audio sample values. In embodiments of the invention, the encoded audio sample values or samples are those obtained by converting of the time domain samples into a spectral representation, such as by means of a MDCT (modified discrete cosine transformation), and encoding the result, such as by quantizing and Huffman coding. Accordingly, in embodiment of the invention, encoding means obtaining the frequency domain samples from the time domain samples and decoding means obtaining the time domain samples from the frequency domain samples. Sample values (samples) obtained by decoding encoded audio data are sometimes referred to herein as output sample values (samples).

Figure 1:
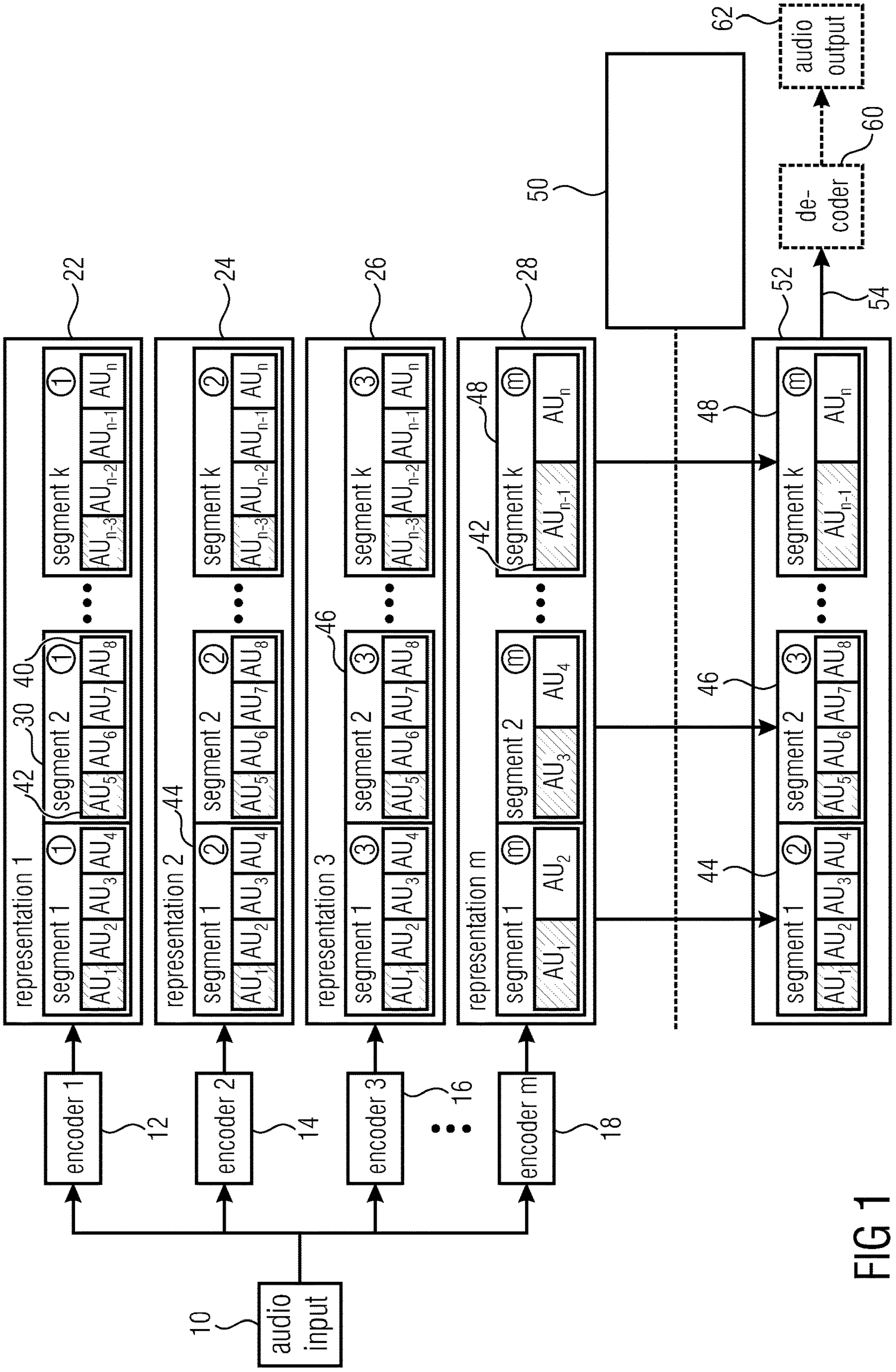
FIG. 1 shows a schematic view of an embodiment of an apparatus for generating encoded audio output data.

FIG. 1 shows an embodiment of an apparatus for generating encoded audio output data. FIG. 1 shows a typical scenario of adaptive audio streaming, which embodiments of the invention may be applied to. An audio input signal 10 is encoded by various audio encoders 12, 14, 16 and 18, i.e. encoders 1 to m. The encoders 1 to m may be configured to encode the audio input signal 10 simultaneously. Typically, encoders 1 to m may be configured such that a wide bit rate range can be achieved. The encoders generate different representations, i.e. coded versions, 22, 24, 26 and 28 of the audio input signal 10, i.e. representations 1 to m. Each representation includes a plurality of segments 1 to k, wherein the second segment of the first representation has been given reference number 30 for exemplary purposes only. Each segment comprises a plurality of frames (access units) designated by the letters AU and a respective index 1 to n indicating the position of the frame in the respective representation. The eighth frame of the first representation is given reference number 40 for exemplary purposes only.

The encoders 12, 14, 16 and 18 are configured to insert stream access points (SAPs) 42 at regular temporal intervals, which define the sizes of the segments. Thus, a segment, such as segment 30, consists of multiple frames, such as $AU_5$, $AU_6$, $AU_7$ and $AU_8$, wherein the first frame, $AU_5$, represents a SAP 42. In FIG. 1, the SAPs are indicated by hatching. Each representation 1 to m represents a compressed audio representation (CAR) for the audio input signal 10 and consists of k such segments. Switching between different CARs may take place at segment borders.

On decoder side, a client may request one of the representations which fits best for a given situation, e.g. for given network conditions. If for some reason the conditions change, the client should be able to request a different CAR, the apparatus for generating the encoded output data should be able to switch between different CARs at every segment border, and the decoder should be able to switch to decode the different CAR at every segment border. Hence, the client would be in a position to adapt the media bit rate to the available channel bit rate in order to maximize quality while minimizing buffer under runs ("re-buffering"). If HTTP (Hyper Text Transfer Protocol) is used to download the segments, such a streaming architecture may be referred to as HTTP adaptive streaming.

Current implementations include Apple HTTP Live Streaming (HLS), Microsoft Smooth Streaming, and Adobe Dynamic Streaming, which all follow the basic principle. Recently, MPEG released an open standard: Dynamic Adaptive Streaming over HTTP (MPEG DASH), see "Guidelines for Implementation: DASH-AVC/264 Interoperability Points", http://dashif.org/w/2013/08/DASH-AVC-264-v2.00-hd-mca.pdf. HTTP typically uses TCP/IP (Transmission Control Protocol/Internet Protocol) as the underlying network protocol. Embodiments of the invention can be applied to all of those current developments.

A switch between representations (encoded versions) shall be as seamless as possible. In other words, there shall not be any audible glitch or click during the switch. Without further measures provided for by embodiments of the invention, this requirement can only be achieved under certain constraints and if special care is taken during the encoding process.

In FIG. 1, the respective encoder which a segment originates from is indicated by a respective mark put within a circle. FIG. 1 further shows a decision engine 50, which decides which representation to download for each segment. A generator 52 generates encoded audio output data 54 from the selected segments which are given reference numbers 44, 46 and 48 in FIG. 1 by concatenating the selected segments. The encoded audio output data 54 may be delivered to a decoder 60 configured to decode the encoded audio output data into an audio output signal 62 comprising audio output samples.

In the embodiment shown in FIG. 1, segments, and therefore frames, originating from different encoders are fed into the same decoder 60, e.g. $AU_4$ from encoder 2 and $AU_5$ from encoder 3 in the example of FIG. 1. In case the same decoder instance is used to decode those AUs it is useful that both encoders be compatible to each other. In particular, without any additional measures, this approach cannot work if the two encoders are from a completely different codec family, say AMR for encoder 2 and G.711 for encoder 3. However, even when the same codec is used across all representations, special care shall be taken to restrict the encoding process. This is because modern audio codec, such as Advanced Audio Coding (AAC) are flexible algorithms which can operate in several configurations using various coding tools and modes. Examples for such coding tools in AAC are Spectral Band Replication (SBR) or Short Blocks (SB). Other important configuration parameters are the sampling frequency ($f_s$, e.g. 48 KHz) or channel configuration (mono, stereo, surround). In order to decode the frames (AUs) correctly, the decoder needs to know about which tools are used and how those are configured (e.g. $f_s$ or SBR cross-over frequency). Therefore, generally, the information that may be used is encoded in a short configuration string and made available to the decoder before decoding.

These configuration parameters may be referred to as codec configuration. In case of AAC, this configuration is known as the Audio Specific Config (ASC).

So far, in order to achieve seamless switching, the codec configuration was restricted to be compatible across representations (encoded versions). For example, the sampling frequency or coding tools are typically identical across all representations. If incompatible codec configurations are used between representations, then the decoder has to be re-configured. This basically means that the old decoder has to be closed and the new decoder has to be started with a new configuration. However, this re-configuration process is not seamless under all circumstances and may cause a glitch. One reason for this is that the new decoder cannot produce valid samples immediately but involves several pre-roll AUs to build up the full signal strength. This start-up behavior is typical for codecs having a decoder state, i.e. where the decoding of the current AU is not completely independent from decoding previous AUs.

As a result from this behavior, the codec configuration was typically constant across all Representations and the only changing parameter was the bit rate. This is e.g. the case for the DASH-AVC/264 profile as defined by the DASH Industry Forum.

This restriction did limit the flexibility of the codec and therefore the coding efficiency across the complete bit rate range. For example, SBR is a valuable coding tool for very low bit rates but limits audio quality at high bit rates. Hence, if the coded configuration is constant, i.e. either with or without SBR, one had to compromise at either the high or low bit rates. Similarly, the coding efficiency could benefit from changing the sampling rate across representations but had to be kept constant because of the above mentioned constraints for seamless switching.

Embodiments of the present invention are directed to a novel approach that enables seamless audio switching in an adaptive streaming environment, and in particular enabling seamless audio switching for AAC-family audio codecs in an adaptive streaming environment. The inventive approach is designed to address all shortcomings resulting from the constraints on the codec configuration as described above. The overall goal is to have more flexibility in the configuration across representations (encoded versions), such as coding tools or sampling frequency, while seamless switching is still enabled or assured.

Embodiments of the invention are based on the finding that the restrictions explained above can be overcome and a higher flexibility can be achieved by adding a special frame carrying additional information in addition to encoded audio sample values associated with the special frame between other frames of encoded audio data, such as a compressed audio representation (CAR). A compressed audio representation may be regarded as a piece of audio material (music, speech, . . . ) after compression by a lossy or lossless audio encoder, for example an AAC-family audio encoder (AAC, HE-AAC, MPEG-D USAC, . . . ) with a constant overall bit rate. In particular, the additional information in the special frame is designed to permit an instantaneous play-out at the decoder side even in case of a switching between different codec configurations. Thus, the special frame may be referred to as an instantaneous play-out frame (IPF). The IPF is configured to compensate for the decoder start-up delay and is used to transmit audio information on previous frames along with the data of the present frame.

Figure 2:
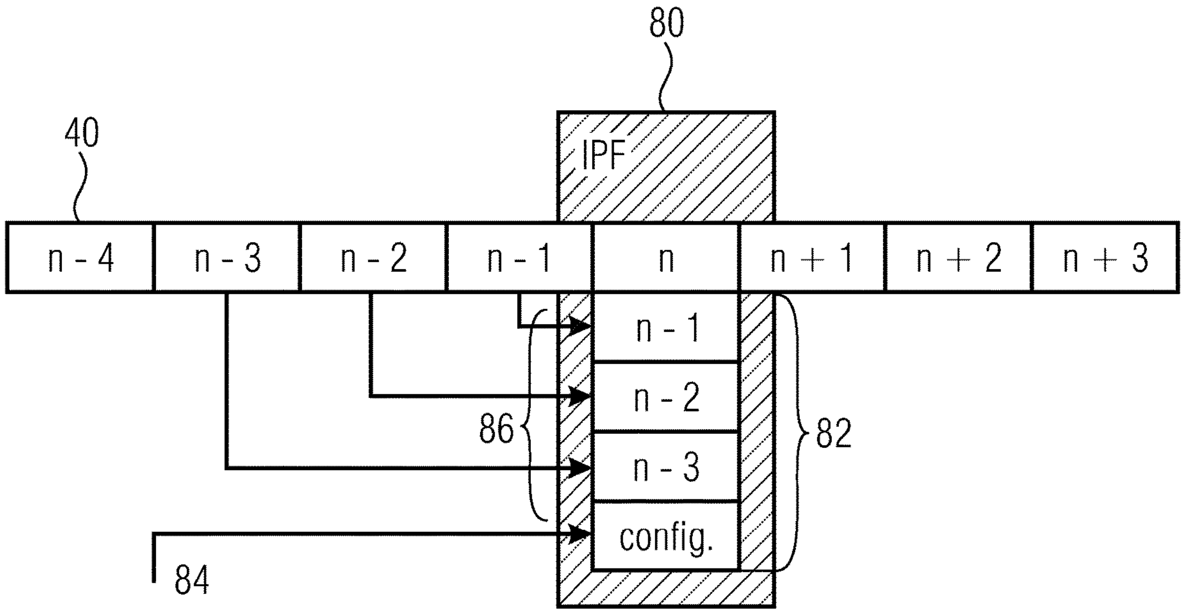
FIG. 2 shows a schematic view for explaining an embodiment of a special frame.

An example of such an IPF 80 is shown in FIG. 2. FIG. 2 shows a number of frames (access units) 40, numbered n−4 to n+3. Each frame includes associated encoded audio sample values, i.e. encoded audio sample values of a specific number of time domain audio sample values of a sequence of time domain audio sample values representing an audio signal, such as audio input signal 10. For example, each frame may comprise encoded audio sample values representing 1024 time domain audio sample values, i.e. audio sample values of an unencoded audio signal. In FIG. 2, frame n arranged between preceding frame n−1 and following frame n+1 represents the special frame or IPF 80. The special frame 80 includes additional information 82. The additional information 82 includes information 84 on the codec configuration, i.e. information on the codec configuration used in encoding the data stream including frames n−4 to n+3, and, therefore, information on the codec configuration used to encode audio sample values associated with the special frame.

In the embodiment shown in FIG. 2, a delay introduced by an audio decoder is assumed to be three frames, i.e. it is assumed that three so-called pre-roll frames are needed to build up the full signal during startup of the audio decoder. Hence, assuming that the stream configuration (codec configuration) is known to the decoder, the decoder would normally have to start decoding at frame n−3 in order to produce valid samples at frame n. Thus, in order to make available the information that may be used to the decoder, the additional information 82 comprises a number of frames of encoded audio sample values preceding the special frame 80 and encoded using the codec configuration 84 indicated in the additional information 82. This number of frames is indicated by reference number 86 in FIG. 2. This number of frames 86 may be used for initializing the decoder to be in a position to decode the audio sample values associated with the special frame n. Accordingly, the information of frame 86 is duplicated and carried as part of the special frame 80. Thus, this information is available to the decoder immediately upon switching to the data stream shown in FIG. 2 at frame n. Without this additional information in frame n, neither the codec configuration 84 nor frames n−3 to n−1 would be available to the decoder after a switch. Adding this information to the special frame 80 permits immediately initializing the decoder, and therefore immediate play-out upon switching to a data stream comprising the special frame. The decoder is configured such that such initialization and decoding of frame n can be performed within the time window available until the output samples obtained by decoding frame n have to be output.

During normal decoding, i.e. without switching to a different codec configuration, only frame n is decoded and the frames included in the additional information, n−3 to n−1, are ignored. However, after switching to a different codec configuration, all of the information in the special frame 80 is extracted and the decoder is initialized based on the included codec configuration and based on decoding of the pre-roll frames (n−3 to n−1) before finally decoding and replaying the current frame n. Decoding of the pre-roll frames takes place before the current frame is decoded and replayed. The pre-roll frames are not replayed, but the decoder is configured to decode the pre-roll frames within the time window available prior to replay of the current frame n.

The term “codec configuration” refers to the codec configuration used in encoding audio data or frames of audio data. Thus, the coding configuration can indicate different coding tools and modes used, wherein exemplary coding tools used in AAC are spectral band replication (SBR) or short blocks (SB). One configuration parameter may be the SBR cross-over frequency. Other configuration parameters may the sampling frequency or the channel configuration. Different codec configurations differ in one or more of these configuration parameters. In embodiments of the invention, different codec configurations may also comprise completely different codecs, such as AAC, AMR or G.711.

Accordingly, in the example illustrated in FIG. 2 three frames, i.e. n−3 to n−1, may be used for compensating the decoder start-up delay. The additional frame data may be transmitted by means of an extension payload mechanism inside the audio bitstream. For example, the USAC extension payload mechanism (UsacExtElement) may be used to carry the additional information. Furthermore, the “config” field may be used to transmit the stream configuration 94. This may be useful in case of bitstream switching or bitrate adaption. Both, the first pre-roll AU (n−3) and the IPF itself (n) may be an independently decodable frame. In the context of USAC encoders may set a flag (usacIndependencyFlag) to “1” for those frames. Implementing the frame structure as shown in FIG. 2 it is possible to randomly access the bitstream at every IPF and play-out valid PCM samples immediately. The decoding process of an IPF may include the following steps. Decode all “pre-roll” AUs (n−3 . . . n−1) and discard the resulting output PCM samples. The internal decoder states and buffers are completely initialized after this step. Decode frame n and start regular play-out. Continue decoding as normal with frame n+1. The IPF may be used as an audio stream access point (SAP). Immediate play-out of valid PCM samples is possible at every IPF.

Special frames as defined herein can be implemented in any codec that allows the multiplexing and transmission of ancillary data or extension data or data stream elements or similar mechanisms for transmitting audio codec external data. Embodiments of the invention refer to the implementation for a USAC codec framework. Embodiments of the invention may be implemented in connection with USAC audio encoders and decoders. USAC means unified speech and audio coding and reference is made to standard ISO/IEC 23003-3:2012. In embodiments of the invention, the additional information is contained in an extension payload of the corresponding frame, such as frame n in FIG. 2. For example, the USAC standard allows addition of arbitrary extension payload to encoded audio data. The existence of extension payload is switchable on a frame to frame basis. Accordingly, the additional information may be implemented as a new extension payload type defined to carry additional audio information of previous frames.

As explained above, the instantaneous play-out frame 80 is designed such that valid output samples associated with a certain time stamp (frame n) can be generated immediately, i.e. without having to wait for the specific number of frames according to the audio codec delay.

In other words, the audio codec delay can be compensated for. In the embodiment shown in FIG. 2, the audio codec delay is three frames. Moreover, the IPF is designed such that it is fully and independently decodable, i.e. without any further knowledge of the previous audio stream. In this regard, the earliest of the number of frames added to the special frame (i.e. frame n−3 in FIG. 2) is not time differentially encoded or entropy encoded relative to any previous frame. In addition, the special frame is not time differentially encoded or entropy encoded relative to any frame previous to the earliest of the number of frames contained in the additional information or any previous frame at all. In other words, for the frames n−3 and n in FIG. 2 all dependencies to previous frames may be removed, e.g. time-differential coding of certain parameters or resetting the entropy encoding. Thus, those independent frames allow correct decoding and parsing of all symbols but are themselves not sufficient to obtain valid PCM samples instantaneously. While such independent frames are already available in common audio codecs, such as AAC or USAC, such audio codecs do not provide for special frames, such as IPF frame 80.

In embodiments of the invention, a special frame is provided at each stream access point of the representations shown in FIG. 1. In FIG. 1 the stream access points are the first frame in each segment and are hatched. Accordingly, FIG. 1 shows a specific embodiment of an apparatus for generating encoded audio output data according to the present invention. Moreover, each of the encoders 1 to m shown in FIG. 1 represents an embodiment of an audio encoder according to the invention. According to FIG. 1, encoders 12 to 18 represent providers configured to provide segments associated with different portions of the audio input signal 10 and encoded by different codec configurations. In this regard, each of encoders 12 to 18 uses a different codec configuration. Decision unit 50 is configured to decide for each segment which representation to download. Thus, decision unit 50 is configured to select a codec configuration (associated with the respective representation) for each segment based on a control signal. For example, the control signal may be received from a client requesting the representation which fits best for a given situation.

Based on the decision of the decision unit 50, block 52 generates the audio output data 54 by arranging the segments one after another, such as segment 46 (segment 2 of representation 3) following segment 44 (segment 1 of representation 2). Thus, special frame $AU_5$ at the beginning of segment 2 allows switching to representation 3 and immediate replay at the border between segments 44 and 46 on the decoder side.

Thus, in the embodiment shown in FIG. 1, a provider (comprising encoders 1 to m) is configured to provide m encoded versions of the audio input 10, with m≥2, wherein the m encoded versions (representations) are encoded using different codec configurations, wherein each encoded version includes a plurality of segments representing the plurality of portions of the sequence of audio sample values, wherein each of the segments comprises a special frame at the beginning thereof.

In other embodiments of the invention, different representations of the same audio input, such as representations 22 to 28 in FIG. 1, may be stored in a memory and may be accessed if a user requests the corresponding media content.

The encoder instances 1 to m shown in FIG. 1 may produce a different encoder delay dependent on the encoder configuration and/or the activation of tools in the encoder instances. In such a case, measures can be taken to ensure that the encoder delays are compensated to achieve a time alignment of the m output streams, i.e. the m representations. This can be implemented, for example, by adding an amount of trailing zero-samples to the encoder input in order to compensate for different encoder delays. In other words, the segments in the different representations shall have the same duration in order to permit seamless switching between representations at the segment boundaries.

Figure 3:
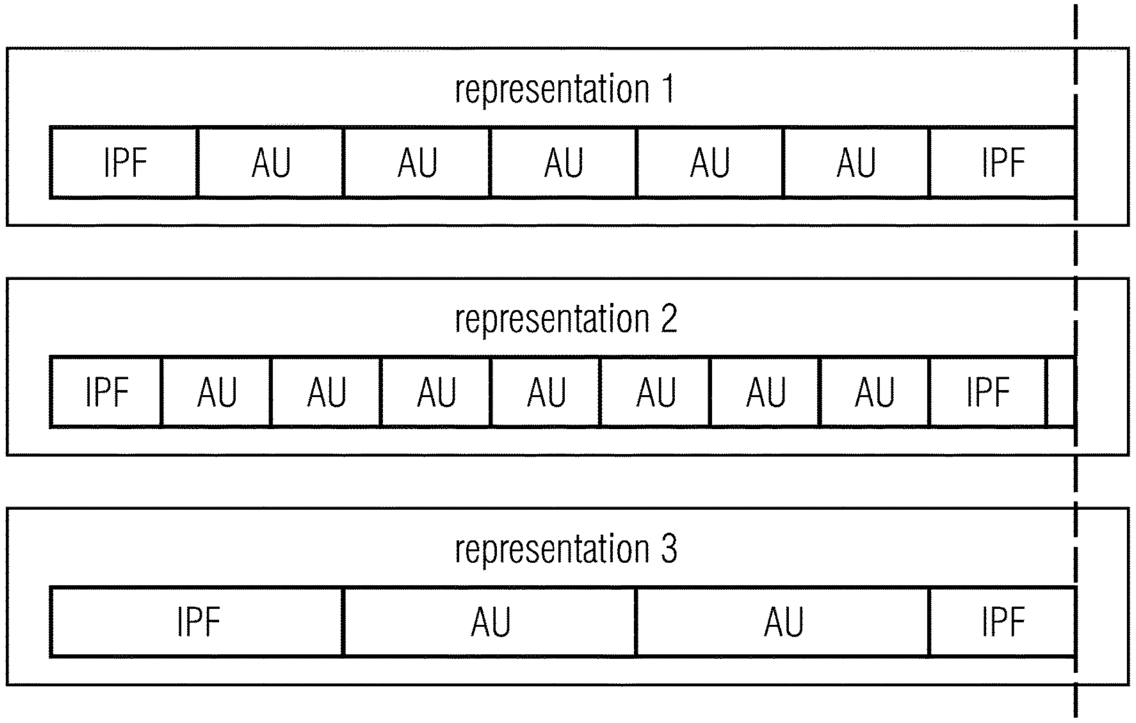
FIG. 3 shows a schematic view of different representations of an audio signal.

The theoretical segment durations depend on the employed sampling rates and frame sizes. FIG. 3 shows an example of possible IPF insertion into representations with different framing, maybe due to different sampling rates and/or frame sizes. Zero-samples may be added to shorter segments at an appropriate position such that all special frames are time aligned as can be seen from FIG. 3.

Figure 4A:
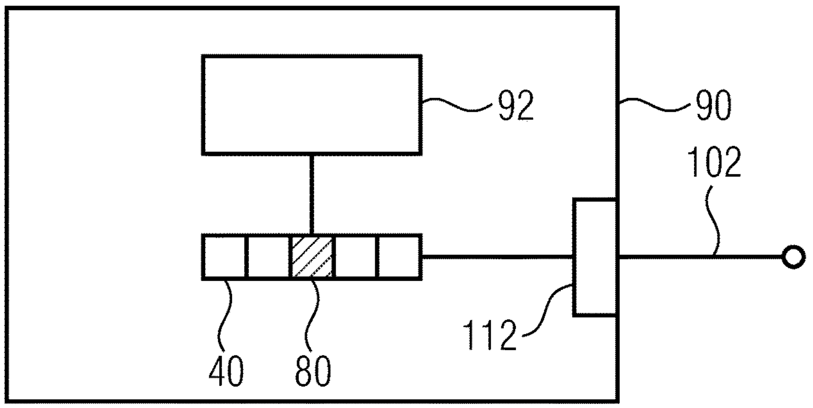
FIG. 4*a* and FIG. 4*b* show schematic views of apparatuses for generating encoded audio output data.

FIG. 4*a* shows a schematic view of an apparatus 90 for generating encoded audio output data 102. The apparatus 90 comprises a provider 92 configured to provide for at least one frame 80 of a plurality of frames 40 as a special frame as it is defined herein. In embodiments of the invention, provider 92 may be implemented as part of an encoder for encoding audio sample values, which provides the frames 40 and adds the additional information to at least one of the frames in order to generate the special frame. For example, provider 92 may be configured to add the additional information as a payload extension to one of frames 40 to generate special frame 80. The frames 40, 80 representing the bit stream of encoded audio data 102 are output via an output 112.

Figure 4B:
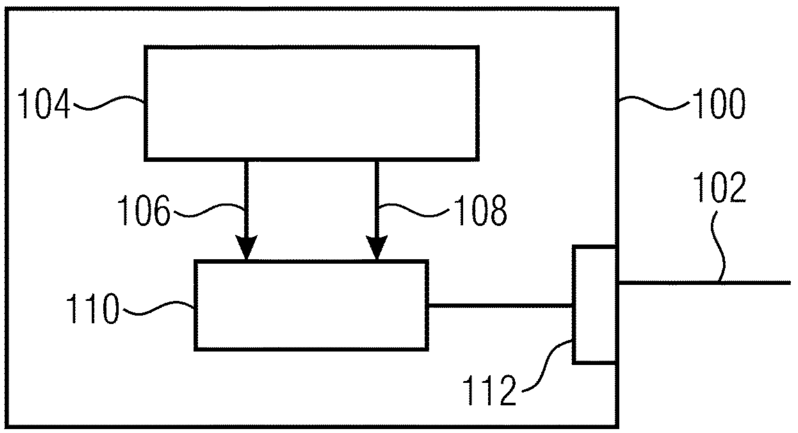

FIG. 4*b* shows a schematic view of an apparatus 100 for generating encoded audio output data 102. The apparatus comprises a provider 104 configured to provide segments 106, 108 associated with different portions of a sequence of audio sample values. A first frame of at least one of the segments is a special frame as explained above. A generator 110 is configured to generate the audio output data by arranging the at least one of the segments 106, 108 following another one of the segments 106, 108. The generator 110 delivers the audio output data to the output 112 configured to output the encoded audio data 102.

Figure 5:
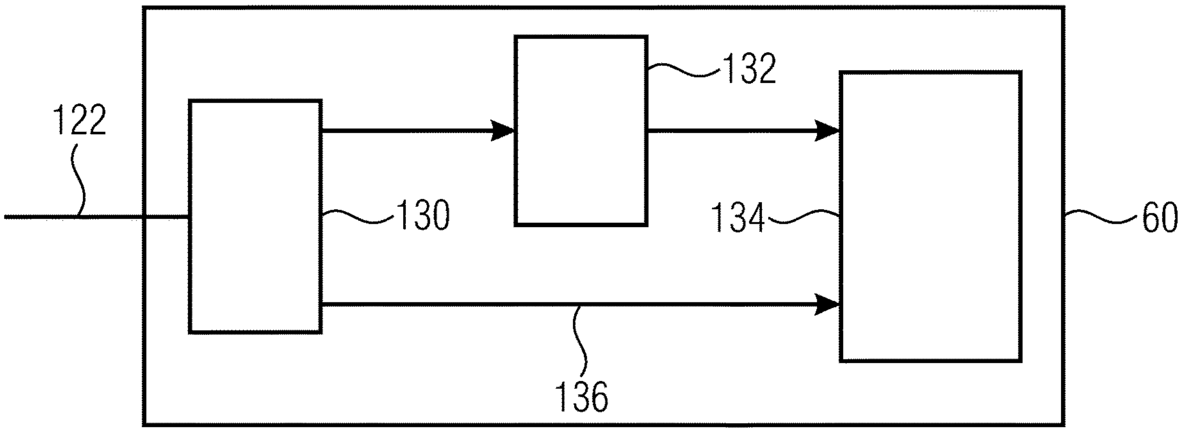
FIG. 5 shows a schematic view of an audio decoder.

FIG. 5 shows a schematic view of an embodiment of the audio decoder 60 for decoding audio input data 122. The audio input data may be the output of block 52 shown in FIG. 1. The audio decoder 60 comprises a determiner 130, an initializer 132 and a decoder core 134. The determiner 130 is configured to determine whether a frame of audio input data 122 is a special frame. The initializer 132 is configured it initialize the decoder core 134 if the frame is a special frame and initialization is useful or desired. Initializing comprises decoding the preceding frames included in the additional information. The decoder core 134 is configured to decode frames of encoded audio sample values using codec configuration with which it is initialized.

In case the frame is not a special frame, it is delivered to the decoder core 134 directly, arrow 136. In case the frame is a special frame and initialization of the decoder core 134 is not required, the determiner 130 may discard the additional information and only deliver the encoded audio sample values of the special frame (without the frames in the additional information) to the decoder core 134. The determiner 130 may be configured to determine whether initializing the decoder core 134 is useful based on information included in the additional information or based on external information. Information included in the additional information may be information on the codec configuration used to encode the special frame, wherein the determiner may decide that initialization is useful if the this information indicates that the preceding frames are encoded using a different codec configuration as the special frame. External information may indicate that the decoder core 134 is to be initialized or reinitialized upon receipt of the next special frame.

In embodiments of the invention, the decoder 60 is configured to initiate the decoder core 134 in one of different codec configurations. For example, different instances of a software decoder core may be initiated using different codec configurations, i.e. different codec configuration parameters as explained above. In embodiments of the invention, initializing the decoder (core) may comprise closing a current decoder instance and opening a new decoder instance using the codec configuration parameters included in the additional information (i.e. within the received bit stream) or delivered externally, i.e. external to the received bit stream. The decoder 60 may be switched to different codec configurations depending on the codec configurations used to encode respective segments of the received encoded audio data.

The decoder 60 may be configured to switch from a current codec configuration, i.e. the codec configuration of the audio decoder prior to encountering the special frame, to a different codec configuration if the additional information indicate a codec configuration different from the current codec configuration.

Figure 6:
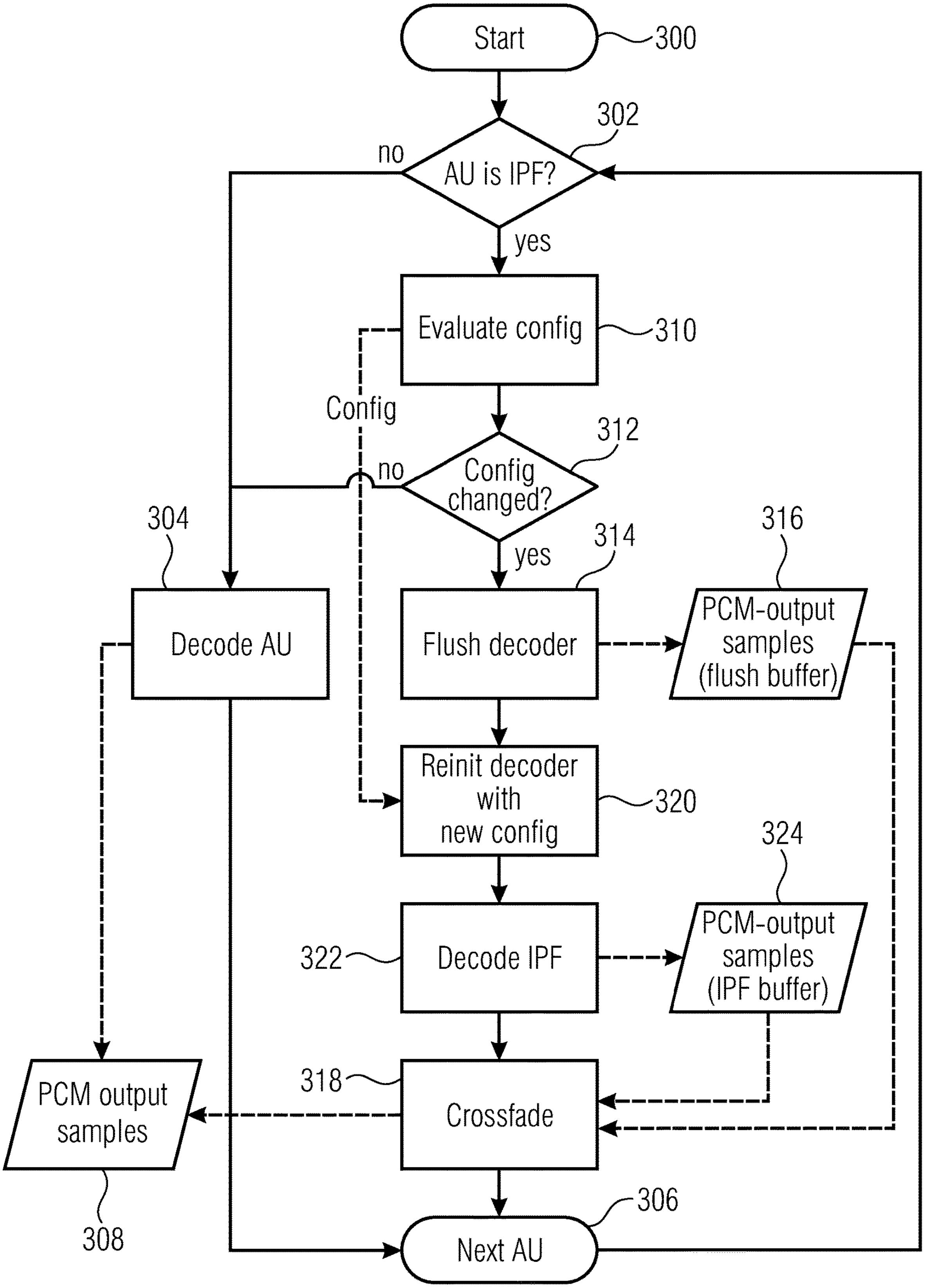
FIG. 6 shows a schematic block diagram for explaining an embodiment of an audio decoder and a method for decoding.
Figure 7:
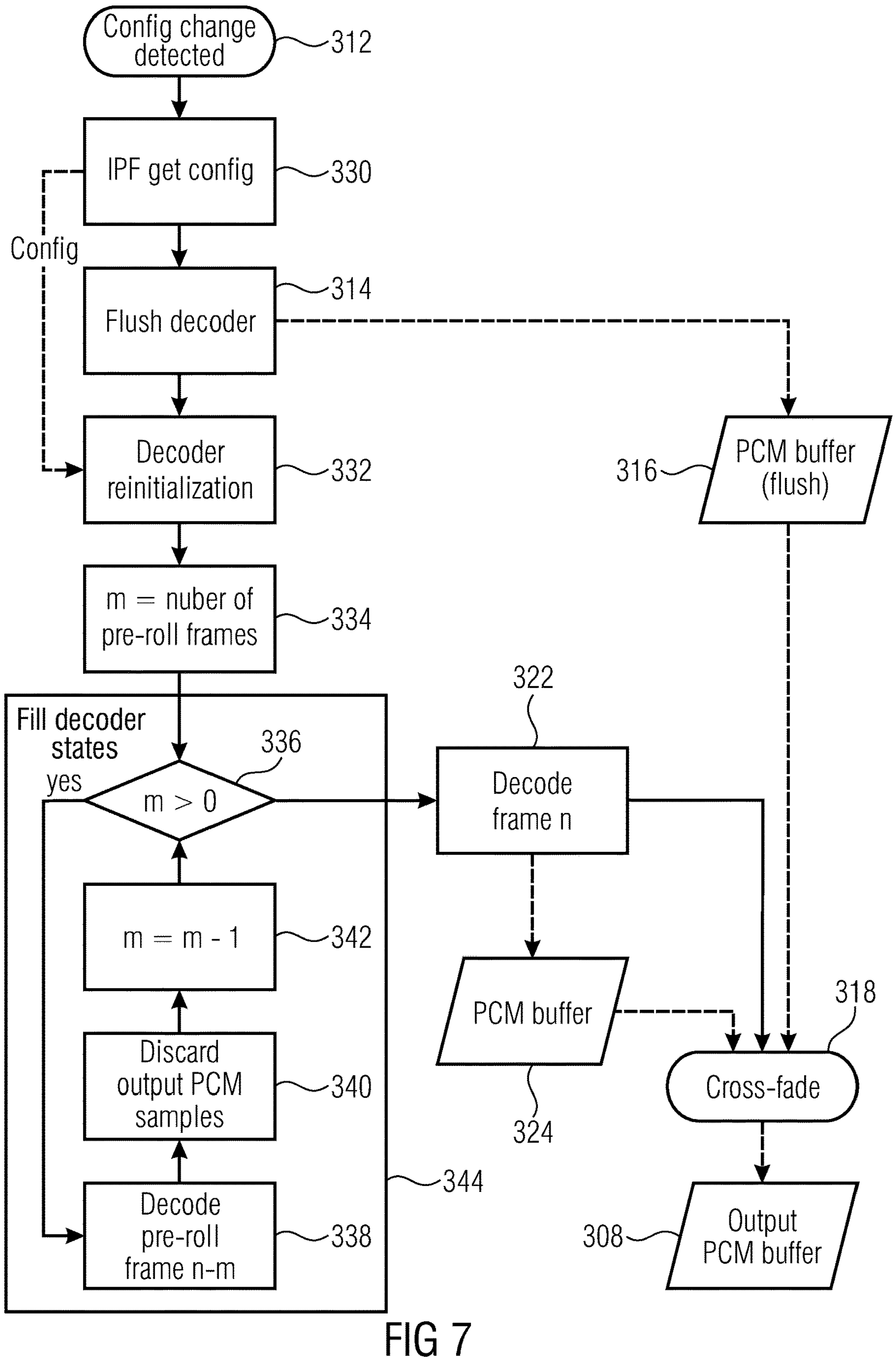
FIG. 7 shows a schematic block diagram for explaining switching of an audio decoder between different codec configurations.
Figure 8:
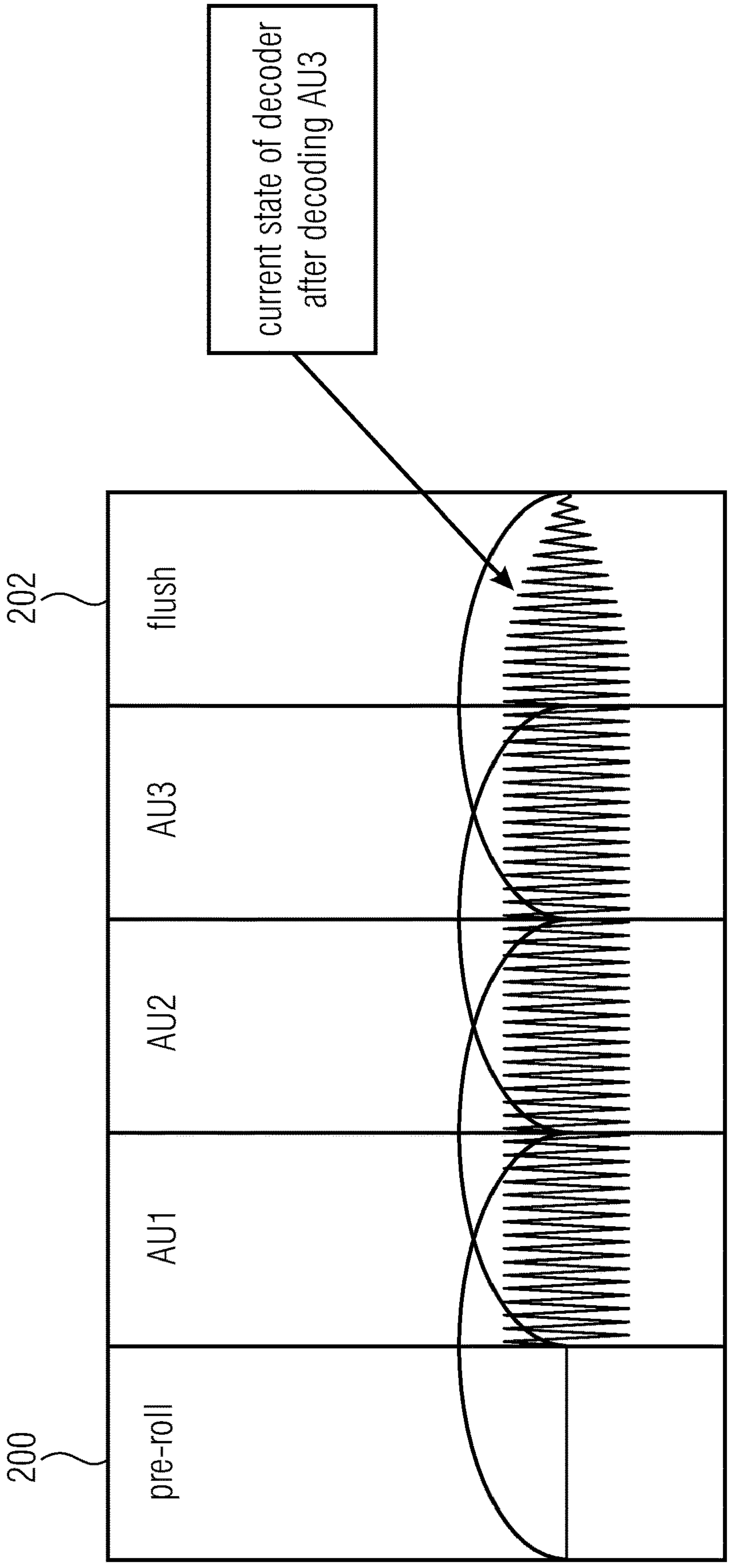
FIG. 8 shows a schematic diagram for explaining AAC (Advanced Audio Coding) decoder behavior.

Further details of an embodiment of an audio decoder having a AAC decoder behavior are explained referring to FIGS. 6 to 8. FIG. 8 schematically shows the behavior of a AAC decoder. Reference is made to the standard ISO/IEC DTR 14496-24, "Audio and Systems Interaction".

FIG. 8 shows the behavior of the decoder over a number of states, a first state 200 corresponding to one or more pre-roll frames, one state associated with each of frames AU1, AU2 and AU3, and a "flush" state 202.

To generate valid output samples for AU1, both the one or more pre-roll frames and frame AU1 have to be decoded. The samples generated by the pre-roll frame(s) are discarded, i.e. are used to initialize the decoder only and are not replayed. However, decoding of the pre-roll frame(s) is mandatory to setup the internal decoder states. In embodiments of the invention, the additional information of the special frames include the pre-roll frame(s). Thus, the decoder is in a position to decode the pre-roll frame(s) to setup the internal decoder states so that the special frame can be decoded and immediate play-out of valid output samples of the special frame can take place. The actual number of "pre-roll' AUs (frames) depends on the decoder start-up delay, in the example of FIG. 8 one AU.

Generally, for file playback, immediate play-out as described referring to FIG. 8 is implemented on system level. So far, it only takes place at decoder start-up. A special frame (IPF) however carries enough information to fully initialize the internal decoder states and fill the internal buffers. Thus, the insertion of special frames enables immediate play-out at random stream positions.

The flush state 202 in FIG. 8 shows the behavior of the decoder if flushing is performed after decoding the last frame $AU_3$. Flushing means feeding the decoder with a hypothetical zero frame, i.e. a hypothetical frame composed of all "digital zero" input samples. Due to the overlap add of the AAC family, flushing results in a valid output which is achieved without consuming a new input frame. This is possible since the last frame $AU_3$ includes prediction information on output sample values that would be obtained when decoding a next frame following frame $AU_3$ since the frames overlap over a number of time-domain sample values. Generally, the first half of a frame overlaps with a preceding frame and a second half of a frame overlaps with a following frame. Thus, the second half of output sample values obtained when decoding a first frame include information on the first half of output sample values obtained when decoding a second frame following the first frame. This characteristic can be exploited when implementing a crossfade as will be explained hereinafter.

Further details of an embodiment of an audio decoder and a method for decoding audio input data are now described referring to FIG. 6, wherein the audio decoder is configured to perform the method as described referring to FIGS. 6 and 7. The process starts at 300. The decoder scans the incoming frames (AUs) for an IPF and determines whether an incoming frame is an IPF, 302. If the incoming frame is not an IPF, the frame is decoded, 304, and the process jumps to the next frame, 306. If there is no next frame, the process ends. The decoded PCM samples are output, as indicated by block 308, which may represent an output buffer. If it is determined in 302 that the frame is an IPF, the codec configuration is evaluated, 310. For example, the "config" field shown in FIG. 2 is evaluated. A determination is made as to whether the codec configuration (stream configuration) has changed, 312. If the codec configuration did not change, i.e. if the additional information indicates a codec configuration identical to the current codec configuration, the additional information, such as the extension payload, is skipped and the process jumps to 304, where decoding is continued as normal.

If the codec configuration has changed, the following steps are applied. The decoder is flushed, 314. The output samples resulting from flushing the decoder are stored in a flush buffer, 316. These output samples (or at least a portion of these output samples) are a first input to a crossfade process 318. The decoder is then reinitialized using the new codec configuration as indicated by the additional information, such as by the field "config" in FIG. 2, and using the preceding frames comprised in the special frame. Upon reinitializing, the decoder is capable to decode the special frame, i.e. the encoded audio sample values associated with the special frame. The special frame is decoded, 322. The output samples (PCM samples) obtained by decoding the special frame are stored as a second input to the crossfade process 318. For example, the corresponding PCM output samples may be stored in a buffer, 324, which may be referred to as IPF buffer. In the crossfade process 318, a crossfade is calculated based on the two input signals from the flush buffer and the IPF buffer. The result of the crossfade is output as PCM output samples, block 308. Thereafter, the process jumps to the next frame 306 and the process is repeated for the next frame. In case the present frame is the last frame, the process ends.

Further details of those steps performed after a configuration change as have been detected in 312 are now explained referring to FIG. 7. The codec configuration is retrieved from the additional information of the IPF, 330 and is provided for decoder reinitialization 332. Prior to reinitializing the decoder, the decoder is flushed, 314, and the resulting output samples are stored in the flush buffer, 316. Reinitializing the decoder may include closing the current decoder instance and opening the new decoder instance with the new configuration. In reopening the new decoder instance, the information on the codec configuration contained in the IPF is used. After opening the new decoder instance, it is initialized by decoding the pre-roll frames included in the IPF. The number of pre-roll frames contained in the IPF is assumed to be m, as indicated by block 334. It is determined whether m>0, 336. If m>0, pre-roll frame n-m is decoded, 338, wherein n indicates the IPF. The obtained output PCM samples are discarded 340. m is reduced by one and the process jumps to block 336. By repeating steps 336 to 342 for all pre-roll frames contained in the IPF, a process of filling the decoder states of the decoder after reopening same is performed, 344. If all pre-roll frames have been decoded, the process jumps to block 332, where the IPF is decoded. The resulting PCM samples are delivered to PCM buffer 342. Crossfading 318 is performed based on outputs from the PCM buffers 316 and 324 and the output of crossfading process 318 is delivered to output PCM buffer 308.

In the embodiment described above, decoder reinitialization includes closing the current decoder instance and opening a new decoder instance. In alternative embodiments, the decoder may include a plurality of decoder instances in parallel, so that decoder reinitialization may include switching between different decoder instances. In addition, decoder reinitialization includes filling decoder states by decoding pre-roll frames included in the additional information of the special frame.

As explained above, taking advantage of internal memory states and buffers (overlap add, filter states) on an AAC decoder it is possible to obtain output samples without passing new input by means of the flushing process. The output signal of the flushing closely resembles the "original signal" for at least a part of the output sample values obtained, in particular the first part thereof, see state 202 in FIG. 8. The obtained output sample values obtained by the flushing process are used for the crossfade process described in detail below.

As can be seen in state 202 in FIG. 8, the energy in the resulting flush buffer will decrease over time depending on the transformation window and the enabled tools of the current codec configuration. Thus, the crossfade should be applied at the first part of the flush buffer, where the output signal can be considered as almost full energy. Exploiting the fact that modern audio codecs can be flushed to obtain valid samples for a successive crossfade helps significantly in obtaining seamless switching values. Accordingly, in embodiments of the invention, the crossfader is configured to perform crossfading between output values obtained by a flush process of the current codec configuration and output sample values obtained by decoding the special frame using the codec configuration indicated in the additional information.

In the following, a specific embodiment of the crossfade process is described. The crossfade is applied to the audio signals as described above in order to avoid audible artifacts during switching of CARs. A typical artifact is a drop in the output signal energy. As explained above, the energy of the flushed signal will decrease depending on the configuration. Thus, the length of the crossfade has to be chosen with care depending on the configuration in order to avoid artifacts. If the crossfade window is too short, then the switching process may introduce audible artifacts due to the difference in the audio waveform. If the crossfade window is too long, then the flushed audio samples have already lost energy and will cause a drop in the output signal energy. For an AAC codec configuration using short transformation windows of 256 samples, a linear crossfade with a length of n=128 samples (per channel) may be applied. In other embodiments, a linear crossfade with a length of for example 64 samples (per channel) may be applied.

An example of a linear crossfade process using 128 samples is described below:

The crossfade process may use the first 128 samples of the flush buffer. The flush buffer is windowed by multiplying the first 128 samples of the flush buffer $S_f=S_{f0}, \ldots, S_{f127}$ by $$\frac{i+1}{128},$$

wherein i is the index of the current sample. The result may be stored in an internal buffer of the crossfader, i.e.

$$S_{f'} = S_{f0} \cdot \left(1 - \frac{1}{128}\right), \ldots, S_{127} \cdot \left(1 - \frac{128}{128}\right).$$

Moreover, the IPF buffer $S_d$ is windowed, wherein the first 128 decoded IPF output samples are multiplied by the factor $$\frac{i+1}{128},$$

wherein i is the index of the current sample. The result may be stored in an internal buffer of the crossfader, i.e.

$$S_{d'} = S_{d0} \cdot \frac{1}{128}, \ldots, S_{127} \cdot 1, \ldots, S_{dn}.$$

The first 128 samples of the internal buffers are added: $S_0=S_{d'0}+S_{f'0}, \ldots, S_{d'127}+S_{f'}, S_{d'128}, \ldots S_{d'n}$, and the resulting values are output to the PCM output samples buffer 308.

Thus, linear crossfading over the first 128 output sample values of the flush buffer and the first 128 sample values of the IPF buffer is achieved.

Generally, the crossfader may be configured to perform crossfading between a plurality of output sample values obtained using the current codec configuration and a plurality of output sample values obtained by decoding the encoded audio sample values associated with the special frame. Generally, in audio codecs, such as the AAC family codecs and the AMR family codecs, encoded audio sample values of a preceding frame implicitly comprise information on the audio signal encoded in a next frame. This property can be utilized in implementing cross-fading when switching between different codec configurations. For example, if the current codec configuration is a AMR codec configuration, the output sample values used in cross-fading may be obtained based on a zero impulse response, i.e. based on the response obtained when a applying a zero frame to the decoder core after the last frame of the current codec configuration. In embodiments of the invention, additional mechanisms used in audio coding and decoding may be utilized in cross-fading. For example, internal filters used in SBR (Spectral Band Replication) comprise delays and, therefore, lengthy settle times that may be utilized in cross-fading. Thus, embodiments of the invention are not restricted to any specific cross-fading in order to achieve a seamless switching between codec configurations. For example, the cross-fader may be configured to apply increasing weights to a first number of output sample values of the special frame and to apply decreasing weights to a number of output sample values obtained based on decoding using the current codec configuration, wherein the weights may increase and decrease linearly or may increase and decrease in a nonlinear manner.

In embodiments of the invention, initialization of the decoder comprises initializing internal decoder states and buffers using the additional information of the special frame (s). In embodiments of the invention, initialization of the decoder takes place if the codec configuration changes. In other embodiments of the invention, the special frame may be used for initializing the decoder without changing the codec configuration. For example, in embodiments of the invention, the decoder may be configured for immediate play-out, wherein the internal states and buffers of a decoder a filled without changing a codec configuration, wherein cross-fading with zero samples may be performed. Thus, immediate play-out of valid samples is possible. In other embodiments, a fast forward function may be implemented, wherein the special frame may be decoded in predetermined intervals depending on the desired fast forward rate. In embodiments of the invention, the decision whether initialization using the special frame shall take place, i.e. is useful or desired, may be taken based on an external control signal supplied to the audio decoder.

Figure 9:
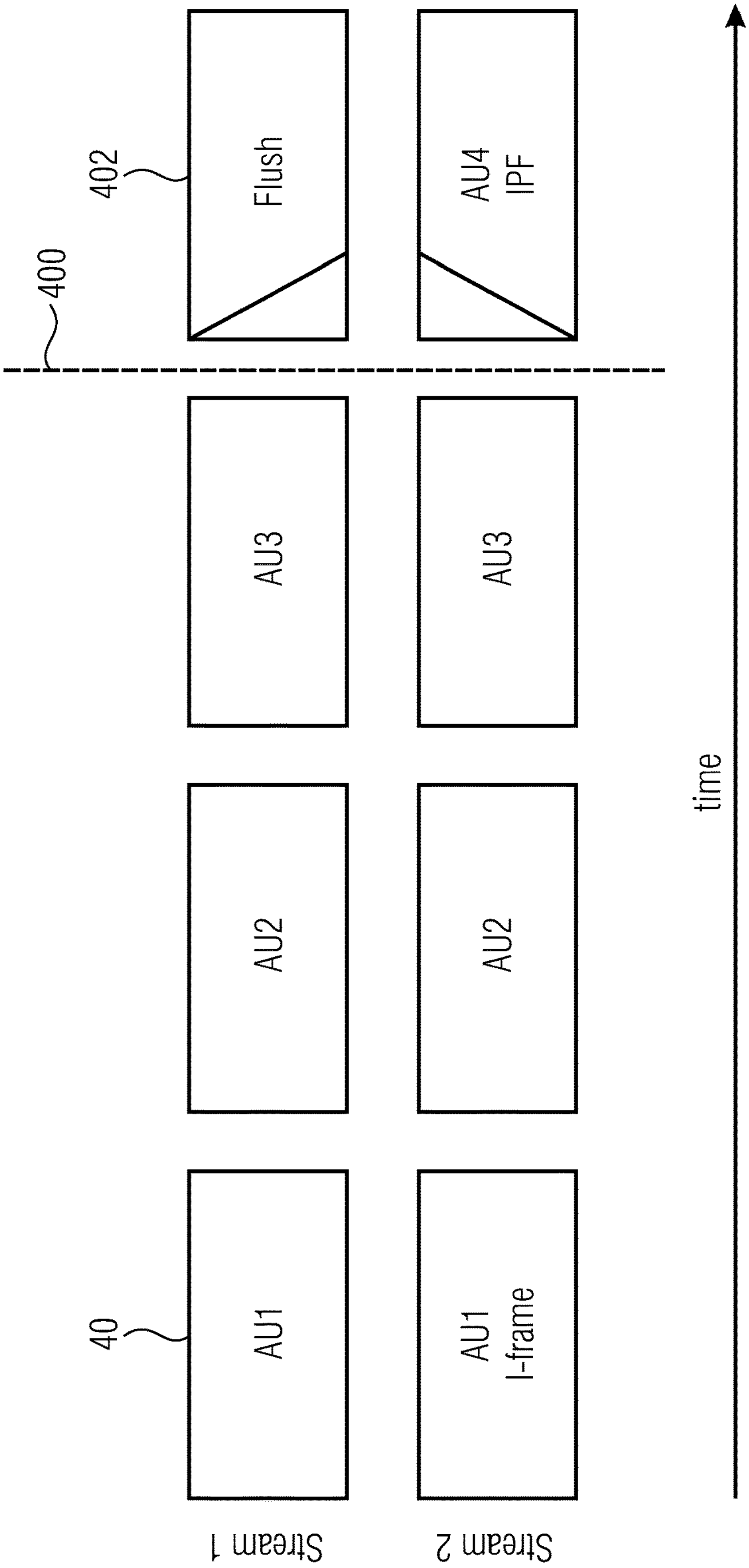
FIG. 9 shows switching from a first stream1 to a second stream 2.

As explained above, the special frame (such as IPF 80 as show in FIG. 2) may be used for bitrate adaption and bitstream switching, respectively. The following restrictions may apply: all representations (e. g. different bitrate, different usage of coding tools) are time aligned), IPFs are inserted into every representation, the IPFs are synchronized, and the IPF field “config” in FIG. 2 contains the stream configuration, i. e. activation of tools etc. FIG. 9 shows an example of bitrate adoption by bitstream switching in an adaptive streaming environment. The control logic (such as the system shown in FIG. 1), which is sometimes called framework, divides the audio data into segments. A segment comprises multiple AUs.

The audio stream configuration may change at every segment border. The audio decoder is not aware of the segmentation, it just is provided with plain AUs by the control logic. To enable audio bitstream switching at every segment border, the first AU of every segment may be an IPF as explained above. In FIG. 9, a segment border 400 is indicated by the dashed line. In the scenario illustrated in FIG. 9, the audio decoder is provided with AUs 40 (AU1 to AU3) of “Stream 1”. The control logic decides to switch to “Stream 2” at the next segment border, i.e. border 400. After decoding AU3 of “Stream 1” the control logic may pass AU4 of “Stream 2” to the audio decoder without any further notice. AU4 is a special frame (IPF) and, therefore, immediate play-out may take place after switching to stream2.

Referring to the scenario shown in FIG. 9, switching may take place as follows: For AU1 to AU3 of stream1, no IPF is detected, and the decoding process is carried out as normal. An IPF is detected for AU4 of stream2. Furthermore, a change in the stream configuration is detected. The audio decoder initializes the flushing process, 402 in FIG. 9. The resulting PCM output samples are stored in a temporary buffer (flush buffer) for later usage. The audio decoder is reinitialized with the stream configuration carried by the IPF. The IPF payload ("pre-roll") is decoded. The resulting output PCM samples are discarded. At this point the internal decoder states and buffers are completely initialized. AU4 is decoded. To avoid switching artifacts a cross-fade is applied. The PCM samples stored in the flush buffer are faded out while the PCM samples resulting from decoding AU4 and stored in the PCM output buffer are faded in. The result of the cross-fade is played out.

Accordingly, the IPF can be utilized to enable switching of compressed audio representations. The decoder may receive plain AUs as input, thus no further control logic is needed.

Details of a specific embodiment in the context of MPEG-D USAC is now described, wherein the bitstream syntax may be as follows:

The AudioPreRoll( ) syntax element is used to transmit audio information of previous frames along with the data of the present frame. The additional audio data can be used to compensate the decoder startup delay (pre roll), thus enabling random access at stream access points that make use of AudioPreRoll( ). A UsacExtElement( ) may be used to transmit the AudioPreRoll( ). For this purpose a new payload identifier shall be used:

TABLE 1

Payload identifier for AudioPreRoll( )

| Name | Value |
|---|---|
| ID_EXT_ELE_AUDIOPREROLL | 4 |

The syntax of AudioPreRoll( ) is shown in FIG. 10 and explained in the following:

configLen size of the configuration syntax element in bytes.

Config( ) the decoder configuration syntax element. In the context of MPEG-D USAC this is the UsacConfig( ) as defined in ISO/IEC 23003-3:2012. The Config( ) field may be transmitted to be able to respond to changes in the audio configuration (switching of streams).

numPreRollFrames the number of pre roll access units (AUs) transmitted as audio pre roll data. The reasonable number of AUs depends on the decoder start-up delay.

auLen AU length in bytes.

AccessUnit( ) the pre roll AU(s).

The pre roll data carried in the extension element may be transmitted "out of band", i. e. the buffer requirements may not be satisfied In order to use AudioPreRoll( ) for both random access and bitrate adaptation the following restrictions apply:

The first element of every frame is an extension element (UsacExtElement) of type ID_EXT_ELE_AUDIOPREROLL.

The corresponding UsacExtElement( ) shall be set-up as described in Table 2.

Consequently, if pre roll data is present, this UsacFrame( ) shall start with the following bit sequence:

"1": usacIndependencyFlag.

"1": usacExtElementPresent (referring to audio pre roll extension element).

"0": usacExtElementUseDefaultLength (referring to audio pre roll extension element).

If no pre roll data is transmitted, the extension payload shall not be present (usacExtElementPresent=0).

The pre roll frames with index "0" and "numPreRollFrames−1" shall be independently decodable, i.e. usacindependencyFlag shall be set to "1".

TABLE 2

Setup of UsacExtElement( ) for AudioPreRoll( )

| usacExtElementType | ID_EXT_ELE_AUDIOPREROLL |
|---|---|
| usacExtElementConfigLength | 0 |
| usacExtElementDefaultLengthPresent | 0 |
| usacExtElementPayloadFrag | 0 |

Random access and immediate play-out is possible at every frame that utilizes the AudioPreRoll( ) structure as described. The following pseudo-code describes the decoding process:

```
if (usacIndependencyFlag == 1) {
   if (usacExtElementPresent == 1 {
      /* In this case usacExtElementUseDefaultLength must be
      0! * /
      if (usacExtElementUseDefaultLength != 0) goto error;
      /* Check for presence of config and re-
initialize if necessary */
      int configLen = getConfigLen( );
      if (configLen > 0){
         config c =
         getConfig(configLen);
         ReConfigureDecoder(c);
      }
      /* Get pre-roll AUs and decode, discard output samples
      */
      int numPreRollFrames = getNumPreRollFrames( );
      for (auIdx = 0; auIdx < numPreRollFrames; auIdx++)
         int auLen = getAuLen( );
         AU nextAU =
         getPreRollAU(auLen);
         DecodeAU(nextAU);
      }
   }
}
/* Decoder states are initialized at this point. Continue
normal decoding */
```

Bitrate adaption may be utilized by switching between different encoded representations of the same audio content. The AudioPreRoll( ) structure as described may be used for that purpose. The decoding process in case of bitrate adaption is described by the following pseudo-code:

```
if (usacIndependencyFlag == 1) {
   if (usacExtElementPresent == 1 {
      /* In this case usacExtElementUseDefaultLength must be
      0! */
      if (usacExtElementUseDefaultLength != 0) goto error;
      int configLen = getConfigLen( );
      if (configLen > 0) {
         config newConfig = getConfig(configLen);
```

-continued

```
        /* Configuration did not change, skip
AudioPreRoll and continue decoding as normal */
        if (newConfig ==
          currentConfig) {
          SkipAudioPreRoll( );
          goto finish;
        }
        /* Configuration changed, prepare for
bitstream switching*/
        config c =
        getConfig (configLen);
        outSamplesFlush =
        FlushDecoder( );
        ReConfigureDecoder(c);
        /* Get pre-roll AUs and decode, discard output samples
        */
        int numPreRollFrames = getNumPreRollFrames( );
        for(auIdx = 0; auIdx < numPreRollFrames; auIdx++)
          int auLen = getAuLen( );
          AU nextAU =
          getPreRollAU(auLen);
          DecodeAU(nextAU);
        }
        /* Get "regular" AU and decode */
        AU au = UsacFrame( );
        outSamples Frame = Decode(au);
        /* Apply crossfade */
        for (i = 0; i < 128; i++){
          outSamples[i] = outSamplesFlush[i] * (1-i/127) +
                          outSamplesFrame[i] * (i/127)
        }
        for (i = 128; i < outputFrameLength; i++) {
          outSamples[i] = outSamplesFrame[i];
        }
      } else {
        goto error;
      }
    }
  }
```

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus. In embodiments of the invention, the methods described herein are processor-implemented or computer-implemented.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, programmed to, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

Some example solutions are listed below.

1 Audio decoder (60) for decoding a bit stream of encoded audio data, wherein the bit stream of encoded audio data represents a sequence of audio sample values and comprises a plurality of frames (40), wherein each frame (40) includes associated encoded audio sample values, the audio decoder (60) comprising: a determiner (130) configured to determine whether a frame of the encoded audio data is a special frame (42, 80) comprising encoded audio sample values associated with the special frame (42, 80) and additional information (82), wherein the additional information (82) comprise encoded audio sample values of a number of frames (86) preceding the special frame, wherein the encoded audio sample values of the preceding frames are encoded using the same codec configuration as the special frame, wherein the number of preceding frames is sufficient to initialize the decoder (60) to be in a position to decode the audio sample values associated with the special frame (42, 80) if the special frame is the first frame upon start-up of the decoder; and an initializer configured to initialize the decoder (60) if the determiner determines that the frame is a special frame, wherein initializing the decoder comprises decoding the encoded audio sample values included in the additional information before decoding the encoded audio sample values associated with the special frame (42, 80).

2. Audio decoder (60) of solution 1, wherein the initializer is configured to switch the audio decoder (60) from a current codec configuration to a different codec configuration (84) if the determiner (130) determines that the frame is a special frame (42, 80) and if the audio sample values of the special frame have been encoded using the different codec configuration.

3. Decoder of solution 2, configured to decode the special frame (42. 80) using the current codec configuration and to discard the additional information if the determiner determines (130) that the frame is a special frame (42, 80) and if the audio sample values of the special frame have been encoded using the current coded configuration.

4. Audio decoder of solution 2, wherein the additional information comprise information on the codec configuration (84) used for encoding the audio sample values associated with the special frame (42, 80), wherein the determiner is configured to determine whether the codec configuration of the additional information is different from the current codec configuration.

5. Audio decoder (60) of one of solutions 2 to 4, comprising a crossfader (318) configured to perform crossfading between a plurality of output sample values obtained using the current codec configuration and a plurality of output sample values obtained by decoding the encoded audio sample values associated with the special frame (42, 80).

6. Audio decoder of solution 5, wherein the crossfader (318) is configured to perform crossfading of output sample values obtained by flushing the decoder (60) in the current codec configuration and output sample values obtained by decoding the encoded audio sample values associated with the special frame (42, 80).

7. Audio decoder of one of solutions 1 to 6, wherein an earliest frame of the number of frames (86) comprised in the additional information (82) is not time-differentially encoded or entropy encoded relative to any frame previous to the earliest frame and wherein the special frame (42, 80) is not time-differentially encoded or entropy encoded relative to any frame previous to the earliest frame of the number of frames preceding the special frame (42, 80) or relative to any frame previous to the special frame (42, 80).

8. Audio decoder of one of solutions 1 to 7, wherein the special frame (42, 80) comprises the additional information as an extension payload and wherein the determiner is configured to evaluate the extension payload of the special frame (42, 80).

9. Apparatus (100; 12. 14, 16, 18) for generating a bit stream of encoded audio data representing a sequence of audio sample values of an audio signal (10), wherein the bit stream of encoded audio data comprise a plurality of frames, wherein each frame includes associated encoded audio sample values, wherein the apparatus (100; 12, 14, 16, 18) comprises: a special frame provider configured to provide at least one of the frames as a special frame (42, 80), the special frame (42, 80) comprising encoded audio sample values associated with the special frame (42, 80) and additional information (82), wherein the additional information (82) comprise encoded audio sample values of a number of frames (86) preceding the special frame, wherein the encoded audio sample values of the preceding frames are encoded using the same codec configuration as the special frame, and wherein the number of preceding frames is sufficient to initialize a decoder (60) to be in a position to decode the audio sample values associated with the special frame (42, 80) if the special frame is the first frame upon start-up of the decoder; and an output (112) configured to output the bit stream of encoded audio data (54, 102).

10. Apparatus (100; 12, 14, 16, 18) of solution 9, wherein the additional information comprise information on the codec configuration (84) used for encoding the audio sample values associated with the special frame (42, 80).

11. Apparatus (100; 12, 14, 16, 18) of solution 9 or 10, wherein the encoded audio data comprise a plurality of segments (30), wherein each segment is associated with one of a plurality of portions of the sequence of audio sample values and comprises a plurality of frames (40). wherein the special frame adder is configured to add a special frame (42, 80) at the beginning of each segment (30).

12. Apparatus (100) of one of solutions 9 or 10, wherein the encoded audio data (54, 102) comprise a plurality of segments (44, 46, 48), wherein each segment (44, 46, 48) is associated with one of a plurality of portions of the sequence of audio sample values and comprises a plurality of the frames (40), the apparatus (100) comprising: a segment provider (104) configured to provide segments (44, 46, 48) associated with different portions of the sequence of audio sample values and encoded by different codec configurations, wherein the special frame provider is configured to provide a first frame (42, 80) of at least one of the segments as the special frame (42, 80); and a generator (52, 1 10) configured to generate the audio output data by arranging the at least one of the segments (44, 46, 48) following another one of the segments (44, 46, 48).

13. Apparatus of solution 12, wherein the segment provider (100) is configured to select a codec configuration for each segment based on a control signal.

14. Apparatus of solution 12 or 13, wherein the segment provider (100) is configured to provide m encoded versions (22, 24, 26, 28) of the sequence of audio sample values, with m≥2, wherein the m encoded versions are encoded using different codec configurations, wherein each encoded version comprises a plurality of segments (30) representing the plurality of portions of the sequence of audio sample values, wherein the special frame provider is configured to provide a special frame (42. 80) at the beginning of each of the segments.

15. Apparatus of solution 14, wherein the segment provider (100) comprises a plurality of encoders (12, 14, 16, 18), each configured to encode at least in part the audio signal according to one of the plurality of different codec configurations.

16. Apparatus of solution 15, wherein the segment provider comprises a memory storing the m encoded versions of the sequence of audio sample values.

17. Apparatus of one of solutions 12 to 15, wherein the special frame provider (100) is configured to provide the additional information as an extension payload of the special frame (42, 80).

18. Method for decoding a bit stream of encoded audio data, wherein the bit stream of encoded audio data represents a sequence of audio sample values and comprises a plurality of frames (40), wherein each frame (40) includes associated encoded audio sample values, comprising: determining whether a frame of the encoded audio data is a special frame (42, 80) comprising encoded audio sample values associated with the special frame (42, 80) and additional information (82), wherein the additional information (82) comprise encoded audio sample values of a number of frames (86) preceding the special frame, wherein the encoded audio sample values of the preceding frames are encoded using the same codec configuration as the special frame, wherein the number of preceding frames is sufficient to initialize a decoder (60) to be in a position to decode the audio sample values associated with the special frame (42, 80) if the special frame is the first frame upon start-up of the decoder; and initializing the decoder (60) if it is determined that the frame is a special frame, wherein the initializing comprises decoding the encoded audio sample values included in the additional information before decoding the encoded audio sample values associated with the special frame (42, 80).

19. Method of solution 18, comprising switching the audio decoder (60) from a current codec configuration to a different codec configuration (84) if it is determined that the frame is a special frame (42, 80) and if the audio sample values of the special frame have been encoded using the different codec configuration.

20. Method of solution 19, wherein the bit stream of audio data comprises a first number of frames encoded using a first codec configuration and a second number of frames following the first number of frames and encoded using a second codec configuration, wherein the first frame of the second number of frames is the special frame.

21. Method of one of solutions 18 to 20, wherein the additional information comprise information on the codec configuration (84) used for encoding the audio sample values associated with the special frame (42, 80), the method comprising determining whether the codec configuration of the additional information is different from the current codec configuration using which encoded audio sample values of frames in the bit stream, which precede the special frame, are encoded.

22. Method for generating a bit stream of encoded audio data representing a sequence of audio sample values of an audio signal (10), wherein the bit stream of encoded audio data comprise a plurality of frames, wherein each frame includes associated encoded audio sample values, comprising: providing at least one of the frames as a special frame (42, 80), the special frame (42, 80) comprising encoded audio sample values associated with the special frame (42. 80) and additional information (82), wherein the additional information (82) comprise encoded audio sample values of a number of frames (86) preceding the special frame, wherein the encoded audio sample values of the preceding frames are encoded using the same codec configuration as the special frame, and wherein the number of preceding frames is sufficient to initialize a decoder (60) to be in a position to decode the audio sample values associated with the special frame (42, 80) if the special frame is the first frame upon start-up of the decoder; and generating the bit stream by concatenating the special frame (42, 80) and the other frames of the plurality of frames.

23. Method of solution 22, wherein the additional information comprise information on the codec configuration (84) used for encoding the audio sample values associated with the special frame (42, 80).

24. Method of solution 22 or 23, comprising providing segments (44, 46, 48) associated with different portions of the sequence of audio sample values and encoded by different codec configurations, wherein a first frame (42, 80) of at least one of the segments is provided as the special frame (42, 80).

25. Computer program for performing, when running on a computer or a processor, the method of one of solutions 18 to 24.

While this invention has been described in terms of several embodiments, there are alterations, permuFtations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An audio decoder for decoding a bit stream of encoded audio data, wherein the bit stream of encoded audio data represents a sequence of audio sample values and comprises a plurality of frames, wherein each frame comprises associated encoded audio sample values, the audio decoder comprising:

a determiner configured to determine whether a frame of the bit stream of encoded audio data is a special frame comprising encoded audio sample values associated with the current frame and additional information, wherein the additional information comprise encoded audio sample values of a number of frames preceding the special frame, wherein the encoded audio sample values of the preceding frames are encoded using the same codec configuration as the current frame, wherein the number of preceding frames is sufficient to initialize the decoder to be in a position to decode the audio sample values associated with the current frame if the special frame is the first frame upon start-up of the decoder; and an initializer configured to initialize the decoder if the determiner determines that the frame is a special frame, wherein initializing the decoder comprises decoding the encoded audio sample values included in the additional information before decoding the encoded audio sample values associated with the current frame, wherein the initializer is configured to switch the audio decoder from a first codec configuration to a different second codec configuration if the determiner determines that the frame is a special frame and if the audio sample values of the current frame have been encoded using the different second codec configuration, and wherein the audio decoder is configured to utilize bitrate adaption by switching between different encoded representations of the same audio content.

2. The audio decoder of claim 1, configured to decode the current frame using the first codec configuration and to discard the additional information if the determiner determines that the frame is a special frame and if the audio sample values of the special frame have been encoded using the first codec configuration.

3. The audio decoder of claim 1, wherein the additional information comprise information on the codec configuration used for encoding the audio sample values associated with the current frame, wherein the determiner is configured to determine whether the codec configuration of the additional information is different from the first codec configuration.

4. The audio decoder of claim 1, comprising a crossfader configured to perform crossfading between a plurality of output sample values acquired using the current codec configuration and a plurality of output sample values acquired by decoding the encoded audio sample values associated with the current frame.

5. The audio decoder of claim 4, wherein the crossfader is configured to perform crossfading of output sample values acquired by flushing the decoder in the first codec configuration and output sample values acquired by decoding the encoded audio sample values associated with the current frame using the different second codec configuration.

6. The audio decoder of claim 1, wherein an earliest frame of the number of frames comprised in the additional information is not time-differentially encoded or entropy encoded relative to any frame previous to the earliest frame and wherein the special frame is not time-differentially encoded or entropy encoded relative to any frame previous to the earliest frame of the number of frames preceding the special frame or relative to any frame previous to the special frame.

7. The audio decoder of claim 1, wherein the additional information is implemented as an extension payload type defined to carry the encoded audio sample values of the number of frames preceding the special frame.

8. A method for decoding a bit stream of encoded audio data, wherein the bit stream of encoded audio data represents a sequence of audio sample values and comprises a plurality of frames, wherein each frame comprises associated encoded audio sample values, comprising:

determining whether a frame of the bitstream of encoded audio data is a special frame comprising encoded audio sample values associated with a current frame and additional information, wherein the additional information comprise encoded audio sample values of a number of frames preceding the special frame, wherein the encoded audio sample values of the preceding frames are encoded using the same codec configuration as the special frame, wherein the number of preceding frames is sufficient to initialize a decoder to be in a position to decode the audio sample values associated with the current frame if the special frame is the first frame upon start-up of the decoder; and initializing the decoder if it is determined that the frame is a special frame, wherein the initializing comprises decoding the encoded audio sample values included in the additional information before decoding the encoded audio sample values associated with the current frame, switching the audio decoder from a first codec configuration to a different second codec configuration if it is determined that the frame is a special frame and if the audio sample values of the special frame have been encoded using the different second codec configuration, wherein the decoder is configured to utilize bitrate adaption by switching between different encoded representations of the same audio.

9. The method of claim 8, wherein the bit stream of audio data comprises a first number of frames encoded using the first codec configuration and a second number of frames following the first number of frames and encoded using the second codec configuration, wherein the first frame of the second number of frames is the special frame.

10. The method of claim 8, wherein the additional information comprise information on the codec configuration used for encoding the audio sample values associated with the current frame, the method comprising determining whether the codec configuration of the additional information is different from a first current codec configuration using which encoded audio sample values of frames in the bit stream, which precede the special frame, are encoded.

11. A non-transitory digital storage medium having a computer program stored thereon to perform a method for decoding a bit stream of encoded audio data, wherein the bit stream of encoded audio data represents a sequence of audio sample values and comprises a plurality of frames, wherein each frame comprises associated encoded audio sample values, comprising:

determining whether a frame of the bitstream of encoded audio data is a special frame comprising encoded audio sample values associated with a current frame and additional information, wherein the additional information comprise encoded audio sample values of a number of frames preceding the special frame, wherein the encoded audio sample values of the preceding frames are encoded using the same codec configuration as the special frame, wherein the number of preceding frames is sufficient to initialize a decoder to be in a position to decode the audio sample values associated with the current frame if the special frame is the first frame upon start-up of the decoder; and initializing the decoder if it is determined that the frame is a special frame, wherein the initializing comprises decoding the encoded audio sample values included in the additional information before decoding the encoded audio sample values associated with the current frame, switching the audio decoder from a first codec configuration to a different second codec configuration if it is determined that the frame is a special frame and if the audio sample values of the special frame have been encoded using the different second codec configuration, wherein the decoder is configured to utilize bitrate adaption by switching between different encoded representations of the same audio, when said computer program is run by a computer or a processor.

* * * * *